United States Patent
Snyder, II (10) Patent No.: US 9,866,657 B2
(45) Date of Patent: Jan. 9, 2018

(54) NETWORK SWITCHING WITH LAYER 2 SWITCH COUPLED CO-RESIDENT DATA-PLANE AND NETWORK INTERFACE CONTROLLERS

(71) Applicant: Cavium, Inc., San Jose, CA (US)

(72) Inventor: Wilson Parkhurst Snyder, II, Holliston, MA (US)

(73) Assignee: Cavium, Inc., San Jose, CA (US)

( * ) Notice: Subject to any disclaimer, the term of this patent is extended or adjusted under 35 U.S.C. 154(b) by 11 days.

(21) Appl. No.: 14/577,448

(22) Filed: Dec. 19, 2014

(65) Prior Publication Data

US 2016/0182692 A1 Jun. 23, 2016

(51) Int. Cl.
*H04L 29/06* (2006.01)
*H04L 12/741* (2013.01)

(52) U.S. Cl.
CPC .............. *H04L 69/22* (2013.01); *H04L 45/74* (2013.01)

(58) Field of Classification Search
None
See application file for complete search history.

(56) References Cited

U.S. PATENT DOCUMENTS

| 2004/0024893 | A1* | 2/2004 | Rajamony | H04L 69/163 709/230 |
|---|---|---|---|---|
| 2011/0271009 | A1* | 11/2011 | Doshi | H04L 45/00 709/242 |
| 2013/0058337 | A1* | 3/2013 | Eddleston | H04L 12/18 370/390 |
| 2013/0294231 | A1* | 11/2013 | Nodir | H04L 49/70 370/230 |
| 2014/0089717 | A1* | 3/2014 | Alsup | G05B 19/05 713/401 |
| 2014/0215598 | A1* | 7/2014 | Ke | H04L 63/0272 726/12 |
| 2014/0286347 | A1* | 9/2014 | Kanigicherla | H04L 49/352 370/401 |
| 2015/0178235 | A1* | 6/2015 | Kanigicherla | G06F 13/4027 710/314 |

* cited by examiner

Primary Examiner — Edan Orgad
Assistant Examiner — Saumit Shah
(74) Attorney, Agent, or Firm — pkalousek.ip (57) ABSTRACT

A system network switching with layer 2 switch communicatively coupled co-resident data-plane and network interface controllers embodying a method for, receiving a packet from a communication network at the layer 2 switch; parsing the packet; and determining in accordance with a content of the parsed packet whether the packet is to be switched to one of one or more medium access controllers, or one of one or more packet input processors, or one of one or more network interface controllers of a network interface resource comprising the one or more packet input processors, one or more packet output processors, the one or more network interface controllers, and the layer 2 switch, implemented on a chip are disclosed.

24 Claims, 6 Drawing Sheets

Prior Art

NETWORK SWITCHING WITH LAYER 2 SWITCH COUPLED CO-RESIDENT DATA-PLANE AND NETWORK INTERFACE CONTROLLERS

BACKGROUND

1. Field

The present disclosure relates to communications in computer networks. More particularly, this invention is directed toward network switching with layer 2 switch coupled co-resident data-plane and network interface controllers.

2. Description of Related Technology

In modern communications networks, information (voice, video, data) is transferred among the nodes of the communications network in a form of packets. A packet is a formatted unit of data carried by a packet-switched network. A packet consists of two kinds of data: control information and user data (also known as payload). The control information provides data the network needs to deliver the user data, for example: source and destination network addresses, error detection codes, sequencing information and other control information known to a person of ordinary skill in the art. Typically, control information is found in packet headers and trailers, with payload data in between.

In traditional computer systems, a computer is connected to a communication network via a network interface controller (NIC). The NIC comprises a network facing physical interface to connect to the communication network, an electronic circuitry required to communicate using a specific physical layer and data link layer standards, and an internal facing physical interface allowing a driver to interface the NIC with the computer. The electronic circuitry may comprise an application-specific integrated circuit (ASIC). An ASIC comprises an integrated circuit (IC) customized for a particular use, rather than an IC intended for general-purpose use.

The packet processing at the NIC is interrupt driven. Interrupt is a signal to the computer's kernel emitted by hardware or software, indicating an event that needs immediate attention. Considering, by means of an example, an incoming packet arriving at the inbound network facing physical interface of the NIC. The NIC writes the packet into the NIC's memory; ascertains that the packet is valid by performing verification, e.g., a Cyclic Redundancy Check (CRC), and then sends the packet to the computer's memory buffer requested by a driver from and allocated by a kernel. A kernel is a computer program that manages input/output requests from software entities, and translates the requests into data processing instructions for the central processing unit and other electronic components of a computer. The kernel is a fundamental part of a modern computer's operating system. After the computer's memory buffer has been allocated, the driver provides the address of the computer's memory buffer to the NIC. After writing the packet to the computer's memory buffer, the NIC sends an interrupt to the kernel. The kernel responds by servicing the interrupt, with all the overhead associated with the interrupt, i.e., suspending current activities, saving the current activities state, and executing an interrupt handler routine. This interruption is temporary, and, after the interrupt handler routine finishes, the processor resumes normal activities.

The interrupt handler routine carries out packet processing related to packet management, e.g., switching/routing, packet/frame discrimination, Quality of service (QoS) enforcement, access control, encryption, Transmission Control Protocol (TCP) offload processing, and other packet management known to a person skilled in the art, and delivers the packet to the destination entity.

The packet management is implemented in the kernel's software, and since the kernel software runs on a general purpose central processing unit, the software implementation has low performance. Coupled with the interrupt overhead, the packet processing using the NIC negatively affects network performance, e.g., throughput, latency, and other network performance criteria known to a person of ordinary skill in the art.

Based on the foregoing, usage of a traditional computer systems for general packet management, is inefficient. To solve at least some of the problems, network processors, which comprise software programmable hardware devices, often implemented as IC, have been developed. Network processors have specific features or architectures optimizing packet processing within the communication networks. Such packet processing may comprise e.g., pattern matching, key lookup, data bit-field manipulation, queue management, control processing, and other processing known to a person of ordinary skill in the art.

Using the specific function of the network processor, the software program implements an application that the network processor executes, resulting in the piece of physical equipment performing a task or providing a service. Such applications may comprise, e.g., switching/routing, packet/frame discrimination, Quality of service (QoS) enforcement, access control, encryption, Transmission Control Protocol (TCP) offload processing, and other applications known to a person skilled in the art.

In addition, network processors use data-plane architecture that defines the processing of the packets arriving on an inbound interface to determine the path from the internal data-plane fabric to the proper outgoing interface(s). To support such architecture, the network processors employ event driven processing. An event is an action or occurrence detected by a system entity that then transfers the event to another entity that is a consumer of the event. The consumer entity eventually applies a reaction to the event. Unlike an interrupt that may demand immediate service at any time, events are normally handled synchronously, i.e., the system explicitly waits for an event to be serviced (typically by calling an instruction that dispatches the next event). Since the event is serviced after a previous event has finished, the overhead associated with interrupt processing is avoided.

Considering, by means of an example, an incoming packet arriving at the network processor network facing inbound interface. The inbound interface writes the packet into a memory; ascertains that the packet is valid by performing verification, e.g., a Cyclic Redundancy Check (CRC) and then sends the packet to the computer's memory buffer requested by the interface and allocated by a memory manager. After the computer's memory buffer has been allocated, the memory manager provides the address of the computer's memory buffer to the processor network inbound interface, which writes the packet to the computer's memory buffer. After writing the packet to the computer's memory buffer, the inbound interface generates an event. The event is provided to an event handling entity, e.g., via a scheduler, that schedules the event processing by the packet destination entity.

When the destination entity is ready to carry out the processing of the packet, the entity requests an event from the event handling entity. The event handling entity then provides the event caused by the packet, and the destination entity carries out the packet processing.

Optionally, the event handling entity may carry out processing related to packet management, e.g., packet/frame discrimination, Quality of service (QoS) enforcement, access control, encryption Transmission Control Protocol (TCP) offload processing, and other packet management known to a person skilled in the art, and delivers the packet to the destination entity. Since the packet management is implemented using the specific function(s) of the network processor, the implementation has high performance.

Current computer systems increasingly employ virtualization, i.e., a process by which a virtual version of computing resources, such as hardware and software resources, i.e., a central processor unit, a storage system, an input/output resources, a network resource, an operating system, and other resources known in the art, are simulated by a computer system, referred to as a host machine. A typical host machine may comprise a hardware platform that optionally together with a software entity, i.e., an operating system, operates a hypervisor, which is software or firmware that creates and operates virtual machines, also referred to as guest machines. Through hardware virtualization, the hypervisor provides each virtual machine with a virtual hardware operating platform. By interfacing with the virtual hardware operating platform, the virtual machines access the computing resources of the host machine to execute virtual machines' respective operations. As a result, a single host machine can support multiple virtual machines, each operating an operating system and/or other software entity, i.e., an application, simultaneously through virtualization.

Figure 1:
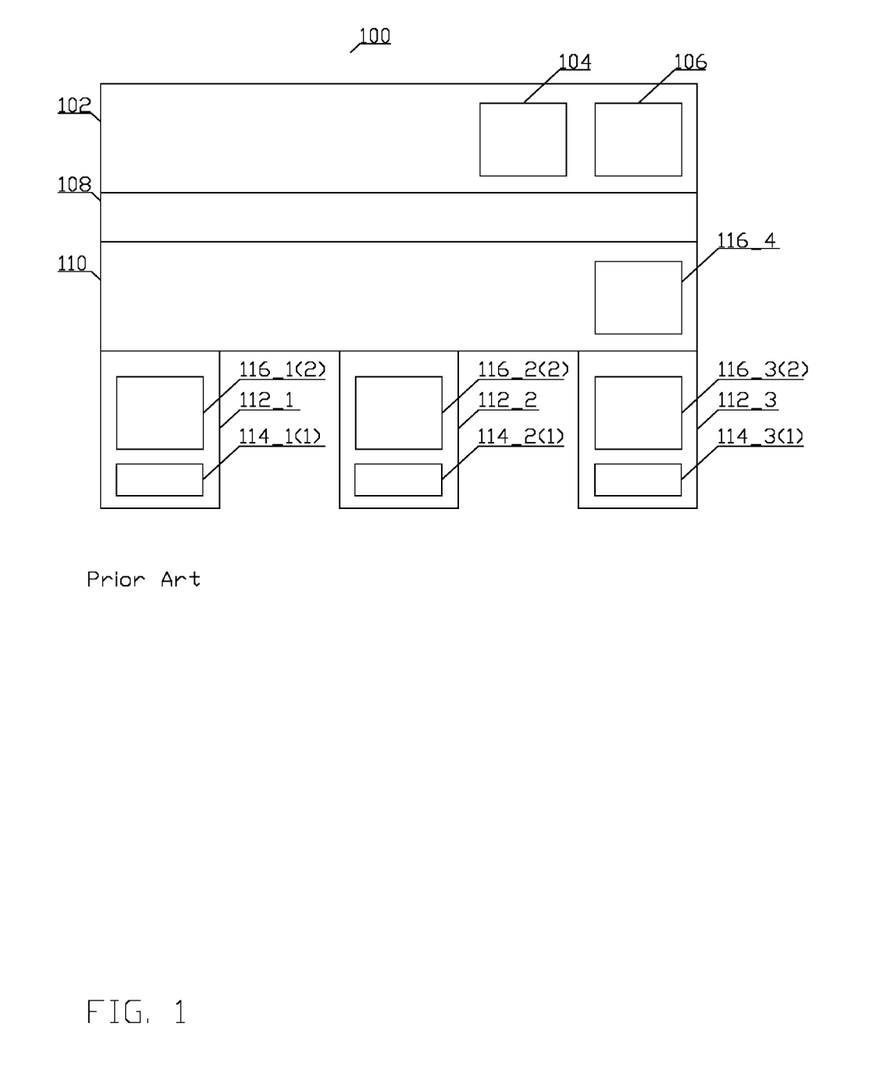
FIG. 1 depicts a conceptual structure of a virtualization system in accordance with known aspects.

FIG. 1 depicts a conceptual structure of a virtualization system 100. A hardware platform 102, comprises all physical entities embodying computing resources required by a specific host machine, i.e., a central processor unit, an input/output resources, a storage system, a network resource, and other resources known to a person having ordinary skill in the art. To avoid undue complexity, only a storage system 104, a network resource 106, are shown. The storage system 104, may comprise a hard drive, a semiconductor based memory, and other types of memory known to a person of ordinary skill in the art. The terms storage system and memory are used interchangeably. The network resource 106 may comprise at least one NIC.

The hardware platform 102, together with an optional software entity 108, i.e., operating system, comprises a host machine operating a Type 2 hypervisor, also known as hosted hypervisor 110. As well known to a person of ordinary skill in the art, the optional software entity 108 is not necessary for Type 1 hypervisor, also known as native hypervisor. A hypervisor is software or firmware entity that creates and operates at least one virtual machine, also referred to as a guest and/or a guest machine. As depicted in FIG. 1, the hosted hypervisor 110 created and operates three virtual machines 112; however different number of virtual machines, including a single virtual machine, is contemplated. Through hardware virtualization, the hosted hypervisor 110 provides each virtual machine 112 with a virtual hardware operating platform. By interfacing with the virtual hardware operating platform, the virtual machines 112 access the computing resources of the host machine to execute the virtual machines' respective operations. As a result, a single host machine can support multiple virtual machines 112, each operating an operating system and/or other software entity, i.e., an application, collectively shown as 116. simultaneously through virtualization. Parameters configuring operation of the virtual machine 112 are defined via structure 114. In an aspect, the structure 114 may comprise at least one register.

To enable transfer of packets into and from the virtualization system 100, via network resource 106, as well as routing the packets among different entities of the virtualization system 100 via internal network, using interrupt driven kernel packet management may degrade network performance. Additionally, divorcing the packet routing and management functionality from the kernel's functionality enables the routing and management functionality to be developed and provided without dependence of a specific kernel's implementation.

One possible approach to the above-identified problems is disclosed in an application Ser. No. 14/542,485 entitled "NETWORK SWITCHING WITH CO-RESIDENT DATA-PLANE AND NETWORK INTERFACE CONTROLLERS," filed on Nov. 14, 2014. The application discloses a network interface apparatus, which implements packet management, including layer 2 switching, layer 3 switching, as a software executing at a co-processor of the network interface apparatus. Consequently, although such arrangement has an advantage in incurring no hardware cost in term of, e.g., additional chip area, power consumption, the packet management may not be as fast as a full hardware implementation of some of the packet management functionality, e.g., the layer 2 switch. The hardware implementation may comprise, e.g., an Application Specific Integrated Circuit (ASIC).

Furthermore, entities of the network interface apparatus, i.e., the NIC, the packet input processor, a packet output processor, and a medium access controller, are communicatively coupled via hardware loopback entities, which limit flexibility of incoming and outgoing packet switching/routing.

Accordingly, there is a need in the art for a network switching, providing a solution to the above identified problems, as well as additional advantages.

SUMMARY

In an aspect of the disclosure, an apparatus with layer 2 switch coupled co-resident data-plane and network interface controllers implementing a method for network switching according to appended independent claims is disclosed. Additional aspects are disclosed in the dependent claims.

BRIEF DESCRIPTION OF THE DRAWINGS

The foregoing aspects described herein will become more readily apparent by reference to the following description when taken in conjunction with the accompanying drawings wherein.

Figure 2:
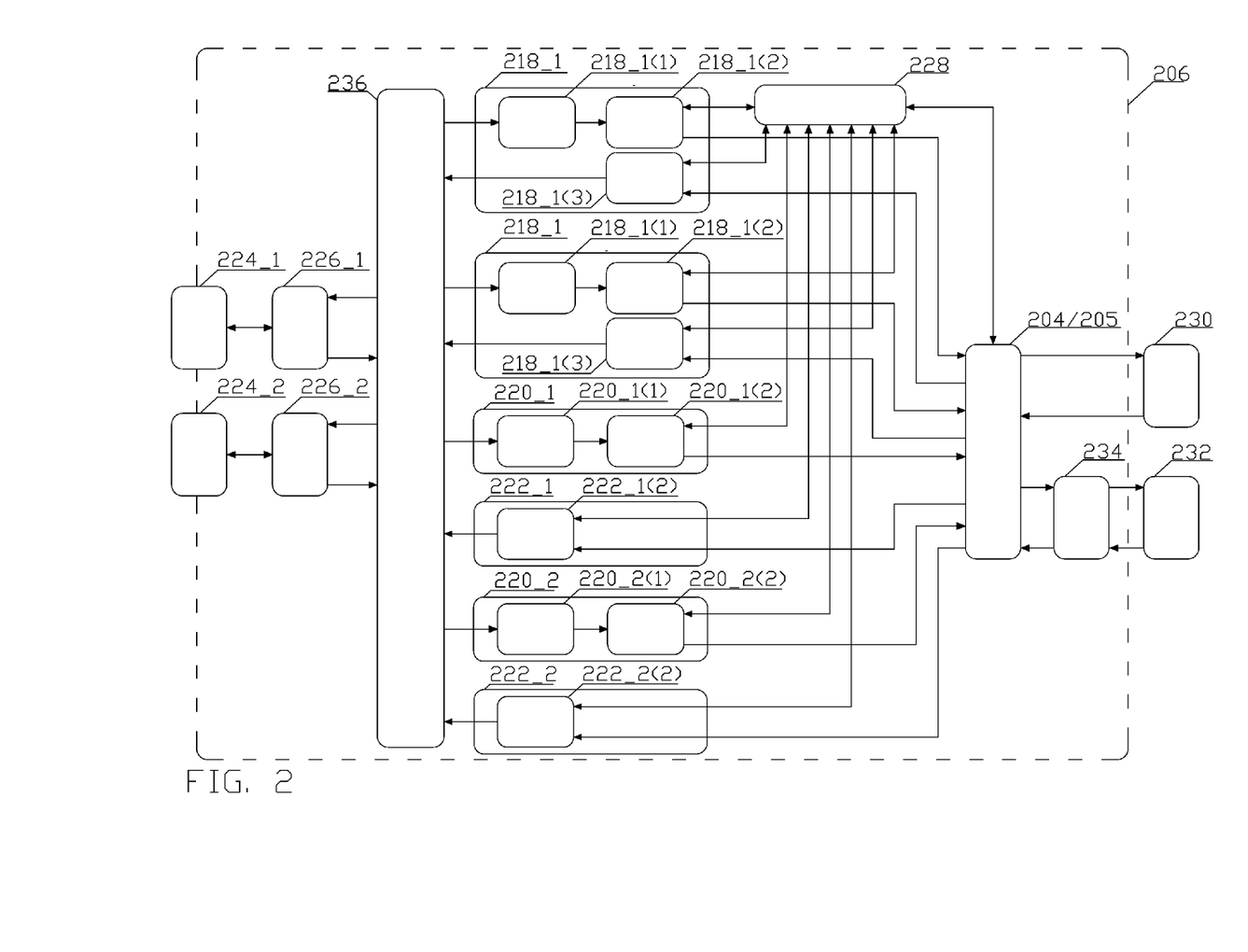
FIG. 2 depicts a conceptual structure of a network interface resources in accordance with an aspect of this disclosure.

The description of like structural elements among the figures, is not repeated, the like elements have reference numerals differing by an integer multiple of 100, i.e., reference numeral 102 in FIG. 1, becomes reference numeral 202 in FIG. 2; unless differences and/or alternative aspects are explicitly noted. An expression "_X" in a reference indicates an instance of an element, while and expression "(X)" indicates a sub-block in a drawing where helpful for better understanding. Any unreferenced single and/or double-arrow line indicates a possible information flow between the depicted entities.

DETAILED DESCRIPTION

Unless otherwise defined, all terms (including technical and scientific terms) used herein have the same meaning as commonly understood by a person having ordinary skill in the art to which this invention belongs. It will be further understood that terms, such as those defined in commonly used dictionaries, should be interpreted as having a meaning that is consistent with their meaning in the context of the relevant art and this disclosure.

As used herein, the singular forms "a," "an," and "the" are intended to include the plural forms as well, unless the context clearly indicates otherwise. It will be further understood that the terms "comprise," "comprises," and/or "comprising," when used in this specification, specify the presence of stated features, integers, blocks, operations, elements, and/or components, but do not preclude the presence or addition of one or more other features, integers, blocks, operations, elements, components, and/or groups thereof. The term "and/or" includes any and all combinations of one or more of the associated listed items.

The term "communicatively coupled" is intended to specify a communication path permitting information exchange either directly among the communicatively coupled entities, or via an intervening entity.

Various disclosed aspects may be illustrated with reference to one or more exemplary configurations. As used herein, the term "exemplary" means "serving as an example, instance, or illustration," and should not necessarily be construed as preferred or advantageous over other configurations disclosed herein.

Various aspects of the present invention will be described herein with reference to drawings that are schematic illustrations of conceptual configurations of the present invention, unless explicitly noted. The various aspects of this disclosure are provided to enable a person having ordinary skill in the art to practice the present invention. Modifications to various aspects of a presented throughout this disclosure will be readily apparent to a person having ordinary skill in the art, and the concepts disclosed herein may be extended to other applications.

FIG. 2 depicts a conceptual structure of a network interface resources 206 in accordance with an aspect of this disclosure. The structure 206 provides at least a layer 2 switch, one or more NICs 218_n, one or more packet input processors (PKI) 220, and one or more packet output processor (PKO) 222 on a single chip, designed to minimize power consumption, chip area, input output, pin-out and other chip characteristics. Thus, the structure does not simply place three or more individual chips, i.e., the switch, the NIC(s), and the PKI(s)/PKO(s), on semiconductor material. A chip comprises a semiconductor material, onto which a set of electronic circuits is fabricated. Although two NICs 208_n are shown, other number, including a single NIC 218, are contemplated. Similarly, although two PKIs/PKOs 220_n/222_n are shown, other number, including a single PKI/PKO 220/222, are contemplated. The PKI/PKO are implemented in a pair.

A packet from a communications network (not shown) arrives via one of one or more physical connectors/ports 224_n and is provided to a communicatively coupled medium access controller (MAC) 226_n. In one aspect, the one or more MACs 226_n are also provided on the chip. MAC 226 comprises a hardware or a hardware and software entity that implements a media access control data communication protocol, i.e., the MAC 226 emulates a full-duplex logical communication channel in a multi-point network and provides the packet to a layer 2 switch 236. Although two physical connectors/ports 224_n and MACs 226_n are shown, other number of physical connectors/ports 224_n and MACs 226_n, including a single physical connector/port 224 and MAC 226, are contemplated.

As appreciated by a person of ordinary skill in the art, layer 2 switching typically uses layer 2 related content of a packet, e.g., a MAC source address, a MAC destination address, a Virtual Local Area Network (VLAN) tag, or any other layer 2 related content known to a person of ordinary skill in the art to decide where to switch the packet. In one aspect, the layer 2 switch 236 switches incoming packets arriving at one of the one or more connectors/ports 224_n and communicatively coupled MACs 226_n, to one of the one or more NICs 218_n, to one of the one or more PKIs 220_n, or to the same or another MAC 226_n, in accordance with the layer 2 related content of the packet. The layer 2 switch 236 may be further be configured to provide additional switching options, e.g., selection of egress ports, port mirroring, and other options known to a person of ordinary skill in the art. In one aspect, the layer 2 switch 236 is implemented as a hardware entity, i.e., in an Application Specific Integrated Circuit (ASIC) thus being faster than a software-based layer 2 switch.

Consider first that the layer 2 switch 236 switches the packet to one of the one or more MAC 226_n, e.g., MAC 226_1. The MAC 226_1 provides the packet to the communicatively coupled physical connector/port 224_1, which provides the packet to the communication network.

Consider now that the layer 2 switch 236 switches the packet to one of the one or more NICs 218_n, e.g., NIC 218_1. The packet is provided via a network facing inbound interface to a parser 218_1(1), which parses the packet in accordance with an implementation of any of the family of computer networking technologies, e.g., an Ethernet, an Internet Protocol (IP), the TCP, and other computer networking technologies known to a person of ordinary skill in the art, to determine the type of protocol used, and to apply some packet management, e.g., Quality of Service (QoS), to the packets. The NIC 218_1 ascertains that the packet is valid by performing verification, e.g., a Cyclic Redundancy Check (CRC). The NIC 218_1 then requests a memory manager 228 to allocate a portion of a storage 204/205 to receive the packet and additional information to another portion of the storage 204/205. The additional information may comprise a complete packet descriptor or a list of commands which form a packet descriptor. The packet descriptor information may comprise, e.g., information at which addresses in the storage 204/205 the different parts of the packet, e.g., a header, payload, are located, and other information known to a person of ordinary skills in the art. The allocated portion of a storage may comprise e.g., a buffer, i.e., a region of a physical storage used to temporarily store data while it is being moved from one place to another. The double reference 204/205 is meant to indicate that the storage may be implemented on chip comprising the network interface resources 206, identified by reference 205, or implemented off the chip as a storage identified by reference 204 residing on the system served by the network interface resources 206, or distributed between a storage on the chip and a storage off the chip.

Once the storage 204/205 has been allocated, the NIC 218_1 writes the packet and the additional information to the allocated portion of the storage 204/205. In one aspect, the NIC 218_1 may use e.g., Direct Memory Access (DMA) engine 218_1(2), which allows the storage 204/205 to be accessed independently of a central processing unit. In accordance with an implementation trading throughput against latency, the NIC 218_1 sends an interrupt to a kernel. Thus, in one aspect, when latency is critical, the NIC 218_1 may send the interrupt after processing each packet; in another aspect, the NIC 218_1 may accumulate several packets into the storage 204/205 before sending the interrupt.

The kernel executes an interrupt handler routine, packet processing related to packet management, e.g., switching/routing, packet/frame discrimination, Quality of service (QoS) enforcement, access control, encryption, Transmission Control Protocol (TCP) offload processing, routing, and other packet management known to a person skilled in the art, determines and delivers the packet to the destination entity 230. The destination entity 230 may comprise a component of the kernel, the operating system, and any other entity of the system served by the network interface resources 206. At the destination entity 230, the delivered packet is placed to a queue (not shown) for processing. Methods for queue management, e.g., a tail drop, a backpressure, a random early discard, a Quality of Service, by the destination entity 230 are well known to a person of ordinary skill in the art. A queue is an organization of data into a structure in which entities, i.e., the data comprising a packet, are kept and are retrievable in a definite order.

When the entity 230 needs to send a data out over the communication network, in one aspect the entity 230 requests the memory manager 228 to allocate a portion of the storage 204/205 to receive a complete packet descriptor, or a list of commands which form a packet descriptor, and notifies a transmit DMA engine 218_n(3) on an internal facing interface of one of the one or more of the NICs 218_n, e.g., the DMA engine 218_1(3). In another aspect, the entity 230 requests the kernel to process the data for a transmission. In response, the kernel requests the memory manager 228 to allocate a portion of the storage 204/205 to receive a complete packet descriptor, or a list of commands which form a packet descriptor, and notifies a transmit DMA engine 218_n(3) on an internal facing interface of one of the one or more of the NICs 218_n, e.g., the DMA engine 218_1(3). In yet another aspect, the entity 230 requests the kernel to process the data for a transmission. In response, the kernel allocates a portion of the storage 204/205 to receive a complete packet descriptor, or a list of commands which form a packet descriptor, and notifies a transmit DMA engine 218_n(3) on an internal facing interface of one of the one or more of the NICs 218_n, e.g., the DMA engine 218_1(3). The DMA engine 218_1(3) reads the packet descriptor and provides the packet via a network facing outgoing interface to the layer 2 switch 236. Alternatively, the DMA engine 218_1(3) executes the list of commands, assembles a packet from the data, and provides the packet via the network facing outgoing interface to the layer 2 switch 236. The layer 2 switch 236 switches the packet to one of the one or more MAC 226_n, e.g., MAC 226_1, in accordance with the layer 2 related content of the packet. The MAC 226_1 then transmits the packet to the communication network via the communicatively coupled physical connector/port 224_1.

Consider now that the layer 2 switch 236 switches the packet to one of the one or more PKIs 220n, e.g., PKI 220_1. The packet is provided via a network facing interface of the PKI 220_1 to a parser 220_1(1), which parses the packet in accordance with an implementation of any of the family of computer networking technologies, e.g., an Ethernet, Internet Protocol (IP), the TCP, and other computer networking technologies known to a person of ordinary skill in the art. In accordance with parameters obtained from fields of the parsed packet, the PKI 220_1 determines a destination software or hardware entity, to receive and process the packet, e.g., the entity 232. The parameters may comprise, e.g., a connector/port 224_n at which the incoming packet was received, a destination MAC address, a destination IP address, and other fields known to a person skilled in the art. The entity 232 may comprise, e.g., an operating system, an application executed by the operating system, such application including a virtual machine, a hard disk, or any other entity known to a person of ordinary skill in the art.

The PKI 220_1 then requests the memory manager 228 to allocate a portion of a storage 204/205 to receive the packet. Such a portion of a memory may comprise e.g., a buffer. The PKI 220_1 writes the packet via an internal facing interface to the allocated portion of the storage 204/205. In one aspect, the PKI 220_1 may use e.g., Direct Memory Access (DMA) engine 220_1(2), which allows the storage 204/205 to be accessed independently of a central processing unit. The PKI 220_1 then provides an event notification to a packet handling software entity 234 that a packet for the entity 232 is available. Such notification may comprise providing an information to packet handling software entity 234 via a scheduler (not shown). Once the software entity 232 is ready to obtain work involving the packet, the software entity 232 requests work from the scheduler. The term work is any operation to be carried out by the software entity 232. The scheduler retrieves the work, in form of the instructions to be processed and an address to the packet(s) on which the work is to be carried out, and provides the work to the entity 232. The entity 232 then requests the packet from the storage 204/205 and the packet is processed by the packet handling software entity 234, which processes the packet in accordance with a packet management policy, and provides the packet to the entity 232, if the policy allows such delivery.

In one aspect, the packet handling software entity 234 may implement functionality related to packet management, e.g., layer 2 switching, layer 3 switching, traffic policing, access control, traffic shaping, deep packet inspection, and other packet management known to a person of ordinary skill in the art. The reason for the layer 2 switching is that certain packets are too complex to be handled by the layer 2 switch 236 and after the initial switching by the layer 2 switch 236, such complex packets must be further processed by a more sophisticated layer 2 switch. Such complex packet may comprise, e.g., network control packets, Internet Control Message Protocol (ICMP) packets, and other packets known to a person of ordinary skill in the art.

By means of an example when a packet is presented to the layer 2 switch 236 and is recognized as a complex packet by examining layer 2 related content of a packet, the layer 2 switch 236 may switch the complex packet to one of the one or more PKIs 220_n, which provides the complex packet for further layer 2 switching by the packet handling software entity 234. Alternatively, the layer 2 switch 236 may switch the complex packet to one of the one or more NICs 218n, which provides the complex packet for further layer 2 switching by the kernel. However, the latter alternative may be less preferred for the reasons discussed supra.

As appreciated by a person of ordinary skill in the art, layer 3 switching uses a routable protocol address from the frame. Such routable protocol may comprise, e.g., IP, Internetwork Packet Exchange (IPX), AppleTalk, and other known to a person of ordinary skill in the art. In traditional systems, the switching functionality is implemented as a hardware entity, i.e., in an Application Specific Integrated Circuit (ASIC). Such an ASIC is not necessary in an aspect of the invention. Since the packet handling software entity 234 is implemented on an already existing hardware entity, i.e., a coprocessor, of the network interface resource 206, the functionality related to packet management may be implemented as additional software on the hardware. Thus, there may be no hardware cost in term of, e.g., additional chip area, power consumption, to this packet management function. A coprocessor is a computer processing unit used to supplement the functions of the central processing unit. Supplemental functions performed by the coprocessor may be floating point arithmetic, graphics, signal processing, string processing, encryption or I/O Interfacing with peripheral devices. The coprocessor carries out these functions under a close control of a supervisory processing unit.

When the entity 232 needs to send a data out over the communication network, the entity 232 requests the memory manager 228 to allocate a portion of the storage 204/205 to receive a complete packet descriptor, or a list of commands which form a packet descriptor, and notifies one of the one or more PKOs' 222_n transmit DMA engine 222_n(2), e.g., the transmit DMA engine 222_1(2). The DMA engine 222_1(2) reads the packet descriptors via the PKO's 222_1 internal facing interface and provides the packet via a PKO's 222_1 network facing interface to the layer 2 switch 236. Alternatively, the DMA engine 222_1(2) executes the list of commands, assembles a packet from the data, and provides the packet via the PKO's 222_1 network facing interface to the layer 2 switch 236. The layer 2 switch 236 determines in accordance with the layer 2 related content of the packet one of the one or more MAC 226_n, e.g., MAC 226_1, to receive the packet. The MAC 226_1 then transmits the packet to the communication network via the communicatively coupled physical connector/port 224_1.

The conceptual structure 206 providing at least a layer 2 switch, one or more NICs, and one or more PKIs/PKOs on a single chip enables use of the chip in applications requiring use of both the NICs and the PKIs/PKOs. By means of an example, consider a virtualized system 100 disclosed in FIG. 1. The operating system 108 may need to use the NIC portion of the network resource 106, while the virtual machine 112_1, which instantiates a data-plane may need to use the PKI/PKO portion of the network resource 106. Additionally, the chip allows providing packet management, including switching of a packet to the operating system 108, and/or other entities communication via a kernel, even if the packet arrives at the PKI/PKO portion of the network resource 106. Such a functionality may allow a packet intended for a plurality of destinations, e.g., a broadcast packet, a multicast packet, to reach all destinations. In addition, even if an entity, e.g., a virtual machine 112_2, is capable of instantiating a data-plane, the entity may still prefer to receive packets via the NIC portion of the network resource 106, because due to the difference between interrupt driven software, i.e., operating system, and event driven software, i.e., data-plane, the application executing on the virtual machine 112_2 may better use the kernel's capabilities. Thus, a packet from a communications network may be switched to the PKI 220 portion of the network resource 106 by the layer 2 switch 236, use some of the efficient packet management functionality provided by the packet handling software entity 234 of the network processor, then be routed via the PKO 222 and the layer 2 switch 236 to the NIC 218 portion of the network resource 106 to be provided to the kernel, should the kernel be the destination entity, or to be provided via the kernel to a destination entity otherwise. Since the packet management has been carried out by the packet handling software entity 234, the kernel's involvement does not significantly impact performance.

Furthermore, an outgoing packet, i.e., packet generated by an entity 230 destined for transmission over the communications network may be routed via one of the one or more NICs 218_n and the layer 2 switch 236 to one of the one or more PKIs 220_n to use some of the efficient packet management functionality provided by the packet handling software entity 234 of the network processor, and then be provided via one of the one or more PKOs 222_n network facing interface to the layer 2 switch 236, which switches the outgoing packet in accordance with the layer 2 related content of the packet to one of the one or more MACs 226_n. The MAC 226_n then transmits the packet to the communication network via the communicatively coupled physical connector/port 224_n.

Figure 3A:
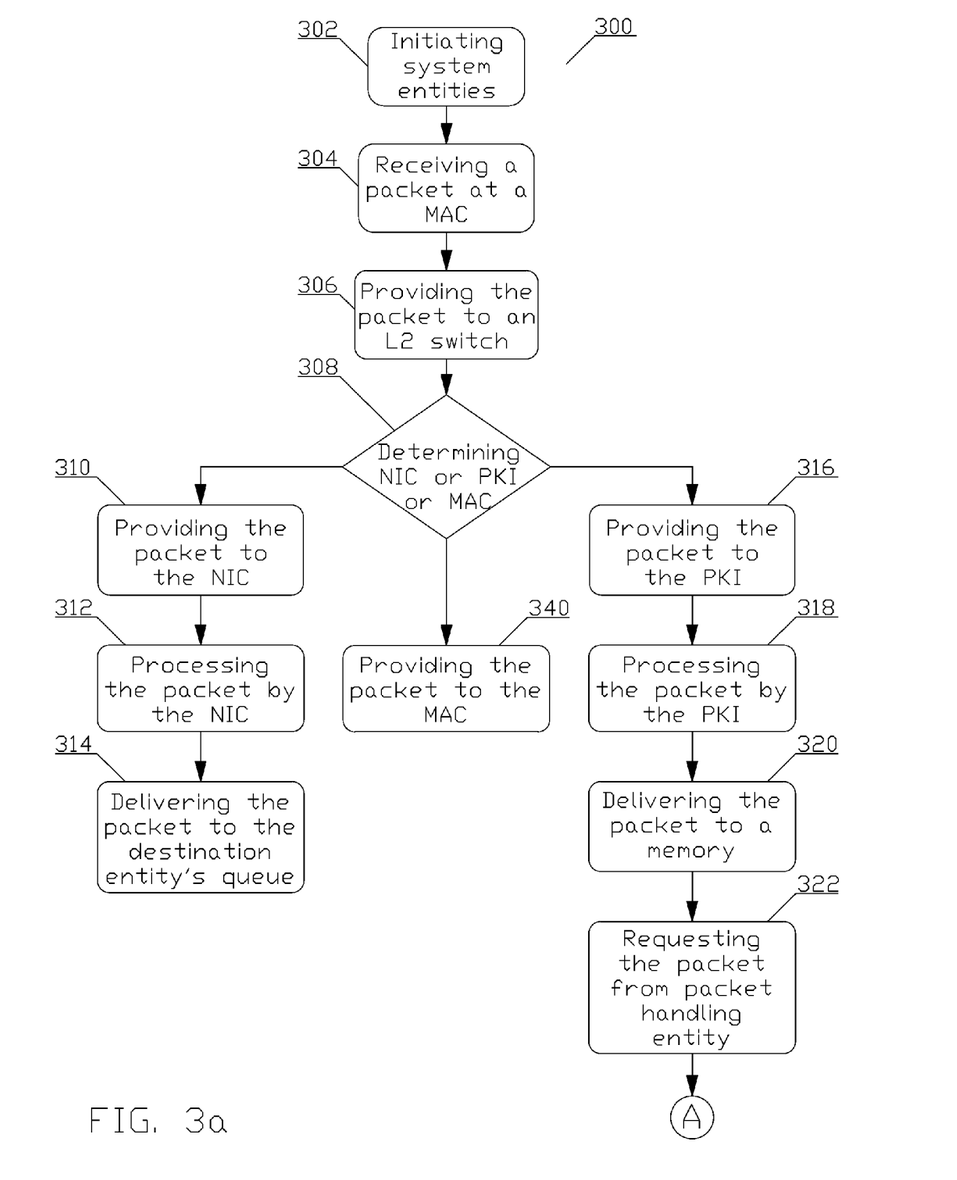
FIG. 3a depicts a first part of a flow chart enabling a process for switching among one of one or more MACs, one of one or more NICs, or one of one or more Packet input processors (PKIs)/Packet output processors (PKOs) for an incoming packet in accordance with an aspect of this disclosure.
Figure 3B:
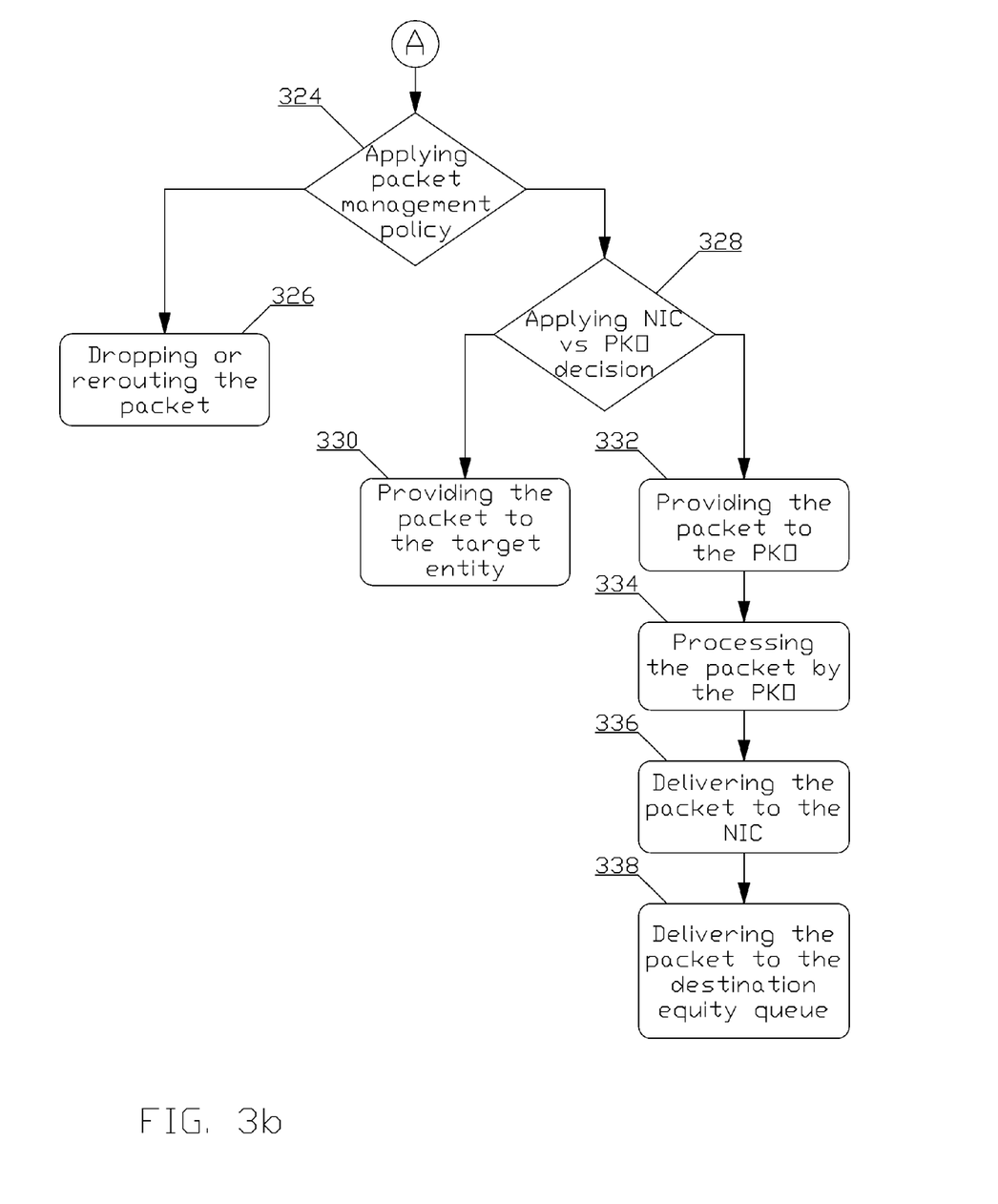
FIG. 3b depicts a second part of the flow chart enabling the process for switching among the one of one or more MACs, the one of one or more NICs, or the one of one or more PKIs/PKOs for the incoming packet in accordance with an aspect of this disclosure.

FIG. 3 depicts a flow chart enabling the process for switching a packet incoming form the communication network at one of the one or more MACs 226_n, among one of one or more NICs 218_n, one of one or more PKIs/PKOs (220_n/222_n), or one of one or more MACs 226_n. To further clarify the relationship between the flow chart of FIG. 3 and certain elements of the conceptual structure of a virtualization system 100 disclosed in greater details in FIG. 1 and associated text, and elements of the network resource 206 as disclosed in FIG. 2 and associated text, references to the elements are in parentheses. Person of ordinary skills in the art will appreciate that virtual system is used as an example, and any system comprising NIC based communication path and data plane communication path is contemplated.

In block 302, a hypervisor (110) initiates entities that configure a specific operation of the virtual system (100), e.g., the hypervisor (110), the virtual machine(s) (112_n), i.e., structures (114_n), and the network resources (106). The process continues in block 304.

In block 304, a packet from a communications network arrives via one of one or more physical connectors/ports (224_n), e.g., the connector/port (224_1), and is provided to a communicatively coupled MAC (226_1). The process continues in block 306.

In block 306, the MAC (226_1) provides the packet to a layer 2 switch (236). The process continues in block 308.

In block 308, the layer 2 switch (236) parses the packet and determines in accordance with a layer 2 related content of the parsed packet whether the packet is to be switched to one of the one or more NICs (218_n), one of the one or more PKIs (220_n), the same MAC (226_1) or another MAC (226_n), e.g., the MAC (226_2).

The process continues in block 310, when the layer 2 switch (236) determines that the packet is to be switched to one of the one or more NICs (218_n); the process continues in block 316 when the layer 2 switch (236) determines that the packet is to be switched to one of the one or more PKIs (220_n); and the process continues in block 340 when the layer 2 switch (236) determines that the packet is to be switch to the MAC (226_1) or the MAC (226_2).

In block 310, the packet is provided to e.g., the NIC (218_1). The process continues in block 312.

In block 312, the NIC (218_1) processes the packet as disclosed supra and sends an interrupt to a kernel. The process continues in block 314.

In block 314, the kernel processes the packet as disclosed supra, and delivers the packet to a queue of the destination entity (230) for processing as disclosed supra. As disclosed, the destination entity may comprise the kernel. The process ends.

In block 316, the packet is delivered to e.g., the PKI (220_1) in accordance with the determination in block 310 that the packet is to be switched to one of the one or more PKIs (220_n). The process continues in block 318.

In block 318, the PKI (220_1) processes the packet to determines a destination entity, i.e., the entity (230) or the entity (232) to receive and process the packet as disclosed supra. The process continues in block 320.

In block 320, the packet is written to an allocated portion of the memory (204/205), and packet handling software entity (234) is notified that a packet for the entity (230) or the entity (232) is available as disclosed supra. The process continues in block 322.

In block 322, the destination entity (230) or the entity (232) that has obtained work involving the packet requests the packet(s) from the packet handling software entity (234) as disclosed supra. The process continues in block 324.

In block 324, the packet handling software entity (234) processes the packet in accordance with a packet management policy. The packet management policy for the packet is determined in accordance with criteria that may be based on the fields in the packet, the rate of a traffic, and other criteria known to a person of ordinary sill in the art. By means of an example, the fields in the packet, e.g., the source or the destination MAC or IP address may be used for access control; the data portion, and possibly the header of the packet may be used for deep packet inspection for protocol non-compliance, viruses, spam, intrusions, or defined criteria to decide whether the packet may be passed, be discarded, or be re-routed to a different destination. By means of another example, the rate of the traffic may be used for traffic policing, and/or traffic shaping. The process continues in block 326 when the packet handling software entity (234) determines that the packet needs to be discarded or be re-routed to a different destination; otherwise, the process continues in block 328.

In block 326, the packet is discarded or re-routed to another entity, e.g., an intrusion detection entity. The process ends.

In block 328, when the PKI (220_1) determines that destination entity to receive the packet is an entity (232), which instantiated a data-plane and the processing continues in block 330. Otherwise the packet is provided to the PKO (222_1), and the processing continues in block 332.

In block 330, the packet is delivered to the destination entity (232).

In block 332, the packet is processed by the PKO (222_1) as disclosed supra. The process continues in block 334.

In block 334, the PKO (222_1) provides the packet to the layer 2 switch (236), which switches the packet to one of the one or more NICs (218_n), e.g., the NIC (218_1), since the destination entity (230) to receive and process the packet is incapable of or does not instantiate a data-plane. The processing continues in block 336.

In block 336, the NIC (218_1) processes the packet as disclosed supra and sends an interrupt to a kernel. The process continues in block 338.

In block 338, the kernel processes the packet as disclosed supra, and delivers the packet, to a queue of the destination entity (230) for processing as disclosed supra. The process ends.

In block 340 the packet is provided to the MAC (226_1) or the MAC (226_2). The process ends.

Figure 4A:
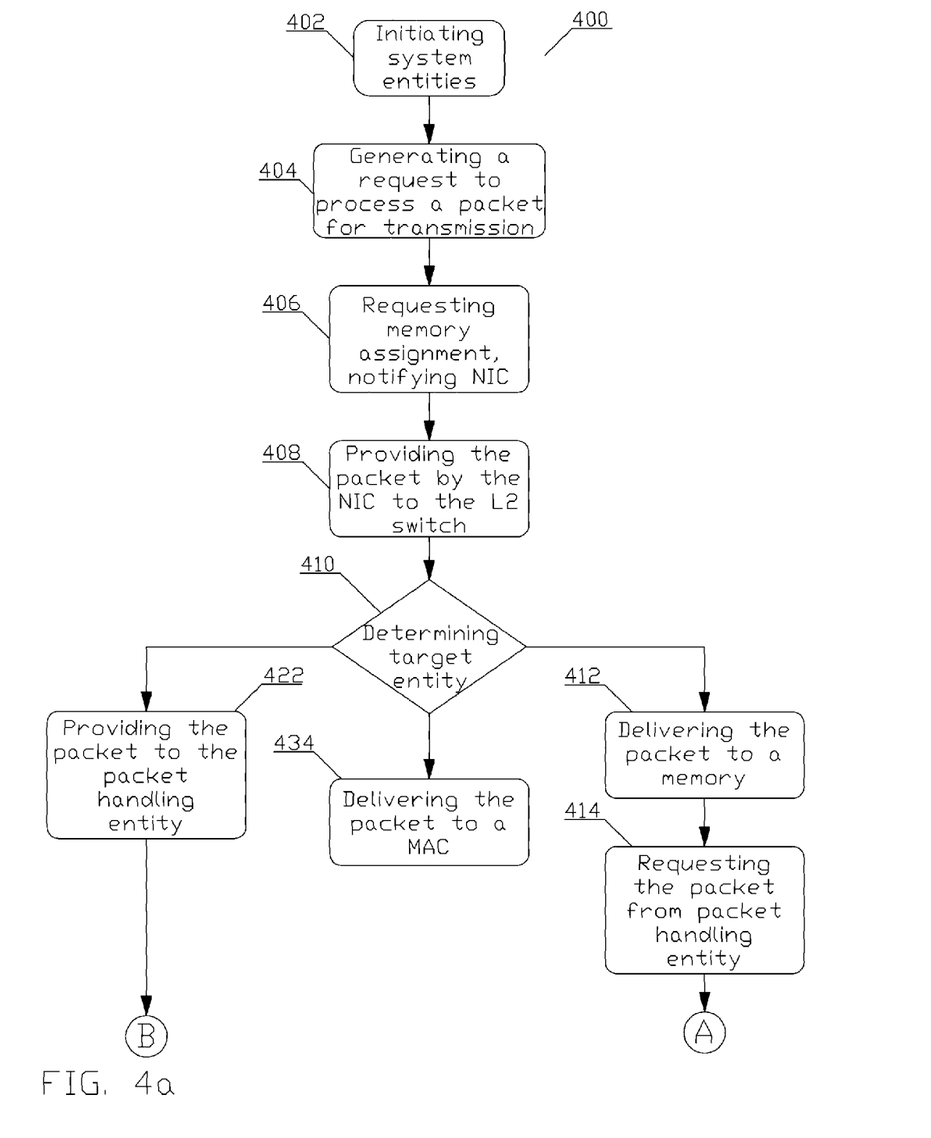
FIG. 4a depicts a first part of a flow chart enabling a process for switching among, the one of one or more MACs, the one of one or more NICs, or the one of one or more PKIs/PKOs for an outgoing packet in accordance with an aspect of this disclosure.
Figure 4B:
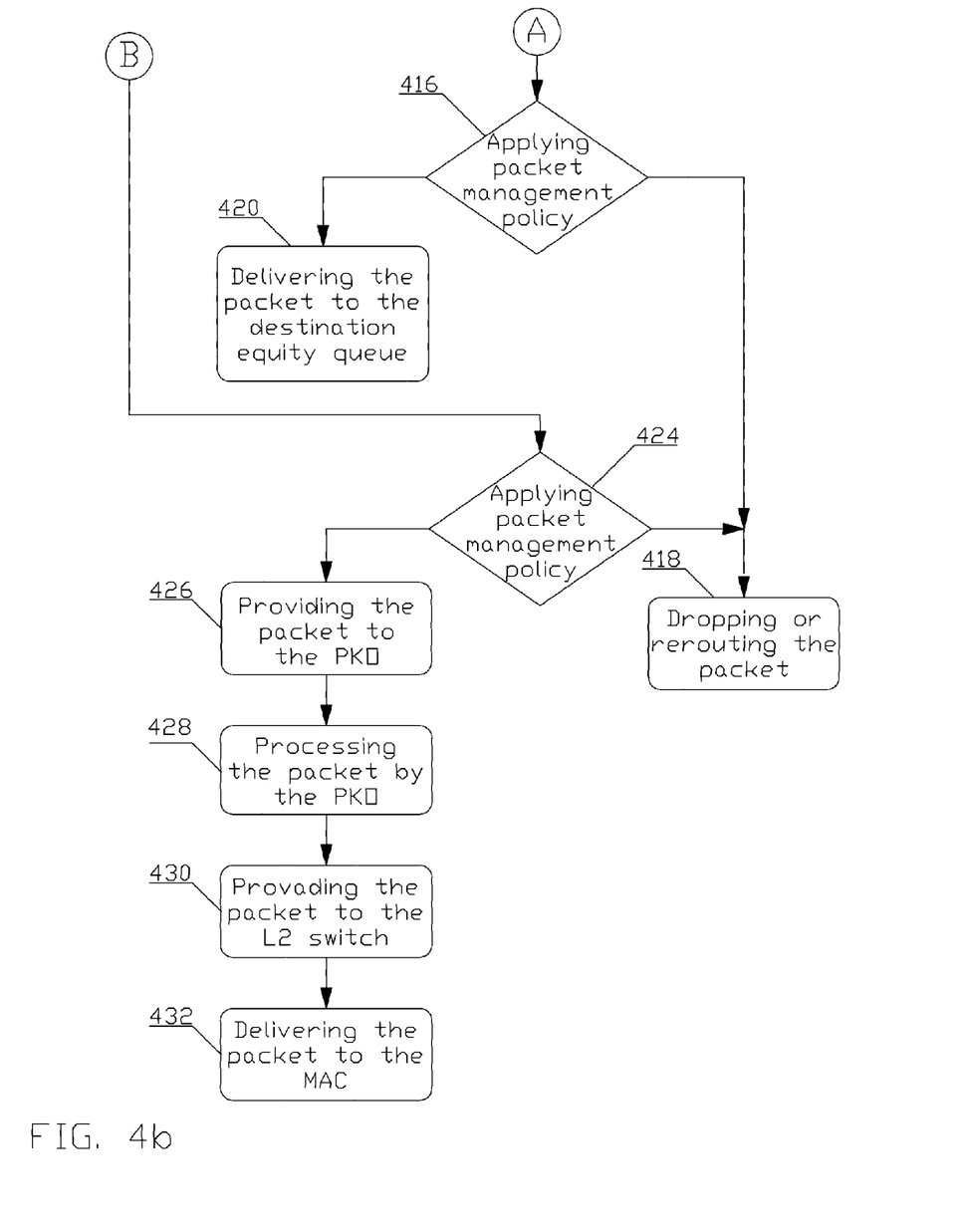
FIG. 4b depicts a second part of the flow chart enabling the process for switching among the one of one or more MACs, the one of one or more NICs, or the one of one or more PKIs/PKOs for the outgoing packet in accordance with an aspect of this disclosure.

FIG. 4 depicts a flow chart enabling the process for switching among, the one of one or more MACs, the one of one or more NICs, or the one of one or more PKIs/PKOs for an outgoing packet. To further clarify the relationship between the flow chart of FIG. 4 and certain elements of the conceptual structure of a virtualization system 100 disclosed in greater details in FIG. 1 and associated text, and the network resource 206 as disclosed in FIG. 2 and associated text, references to the structural elements are in parenthesis. Person of ordinary skills in the art will appreciate that virtual system is used as an example, and any system comprising NIC based communication path and data plane communication path is contemplated.

In block 402, a hypervisor (110) initiates entities that configure a specific operation of the virtual system (100), e.g., the hypervisor (110), the virtual machine(s) (112_n), i.e., structures (114_n), and the network resource, (106). The process continues in block 404.

In block 404, an entity of the virtual system (100), e.g., an entity (230) executing on one of the virtual machines (112_n), e.g., the virtual machine (112_1), needs to send data to another entity. Such another entity may be executing on the virtual system (100) or may comprise an entity outside the virtual system (100). In one aspect, the entity (230) generates a request to process the data for a transmission. In one aspect, the request is provided to a kernel; in another aspect, the request is provided to a memory manager (228). The process continues in block 406.

In block 406, in response to the request, in one aspect, the kernel requests the memory manager (228) to allocate a portion of the storage (204/205) to receive a complete packet descriptor, or a list of commands which form a packet descriptor, and notifies a transmit DMA engine (218(3)) in one of the one or more NICs (218_n), e.g., the transmit DMA engine (218_1(3)). In another aspect, the kernel allocates a portion of the storage (204/205) to receive a complete packet descriptor, or a list of commands which form a packet descriptor, and notifies a transmit DMA engine (218(3)) in one of the one or more NICs (218_n), e.g., the transmit DMA engine (218_1(3)). The process continues in block 408.

In another aspect, in response to the request, the memory manager (228) allocates a portion of the storage (204/205) to receive a complete packet descriptor, or a list of commands which form a packet descriptor, and notifies a transmit DMA engine (218(3)) in one of the one or more NICs (218_n), e.g., the transmit DMA engine (218_1(3)). The process continues in block 408.

In block 408, the DMA engine (218_1(3)) reads the packet descriptors or, alternatively, executes the list of commands and assembles a packet from the data, and provides the packet to the layer 2 switch (236). The process continues in block 410.

In block 410, the layer 2 switch (236) parses the packet and determines in accordance with a layer 2 related content of the parsed packet to which entity the packet is to be provided. When the layer 2 switch (236) determines that the packet is to be provided directly to an entity outside the virtual system (100), the process continues in block 434; otherwise when the layer 2 switch (236) determines that the packet is to be processed by the packet handling software entity (234) before being provided to an entity outside the virtual system (100), the process continues in block 422; otherwise, when the layer 2 switch (236) determines that the destination entity is within the virtual system (100), e.g., an entity (232) running on, e.g., the virtual machine (112_2), the process continues in block 412.

In block 434, the layer 2 switch (236) provides the packet to one of the one or more output connectors/ports (224_n) via a communicatively coupled MAC (226_n), since the destination entity to receive and process the packet is outside the virtual system (100). The process ends.

In block 412, the packet is written to the allocated portion of the memory (204/205), and packet handling software entity (234) is notified that a packet for the entity (232) is available as disclosed supra. The process continues in block 414.

In block 414, the target software or hardware entity (232) that has obtained work involving the packet requests the packet from the packet handling software entity (234) as disclosed supra. The process continues in block 416.

In block 416, the packet handling software entity (234) processes the packet in accordance with a packet management policy. The packet management policy for the packet is determined in accordance with different criteria. Such criteria may be based on the fields in the packet, the rate of a traffic, and other criteria known to a person of ordinary sill in the art by means of an example, the fields in the packet, e.g., the source or the destination MAC or IP address may be used for access control; the data portion, and possibly the header of the packet may be used for deep packet inspection for protocol non-compliance, viruses, spam, intrusions, or defined criteria to decide whether the packet may be passed, be discarded, or be re-routed to a different destination. By means of another example, the rate of the traffic may be used for traffic policing, and/or traffic shaping. The process continues in block 418 when the packet handling software entity (234) determines that the packet need to be discarded or be re-routed to a different destination; otherwise, the process continues in block 420.

In block 418, the packet is discarded or re-routed to another entity, e.g., an intrusion detection entity.

In block 420, the packet is delivered to the queues of the destination entity (232).

In block 422, the packet is delivered to the packet handling software entity (234). The process continues in block 424.

In block 424, the packet handling software entity (234) processes the packet in accordance with a packet management policy. The packet management policy for the packet is determined in accordance with criteria that may be based on the fields in the packet, the rate of a traffic, and other criteria known to a person of ordinary sill in the art by means of an example, the fields in the packet, e.g., the source or the destination MAC or IP address may be used for access control; the data portion, and possibly the header of the packet may be used for deep packet inspection for protocol non-compliance, viruses, spam, intrusions, or defined criteria to decide whether the packet may be passed, be discarded, or be re-routed to a different destination. By means of another example, the rate of the traffic may be used for traffic policing, and/or traffic shaping. The process continues in block 418 when the packet handling software entity (234) determines that the packet need to be discarded or be re-routed to a different destination; otherwise, the process continues in block 426.

In block 426, the packet is provided to e.g., the PKO (222_1). The process continues in block 428.

In block 428, the packet is processed by the PKO (222_1) as disclosed supra. The process continues in block 430.

In block 430, the PKO's (222_1) network facing interface provides the packet to the layer 2 switch (236), which determines in accordance with a layer 2 related content of the packet one of the one or more MACs (226_n), e.g., the MAC (226_1), to receive the packet. The process continues in block 432.

In block 432, the MAC (226_1) then transmits the packet to the communication network via a communicatively coupled physical connector/port (224_1), since the destination entity to receive and process the packet is outside the virtual system (100). The process ends.

The various aspects of this disclosure are provided to enable a person having ordinary skill in the art to practice the present invention. Various modifications to these aspects will be readily apparent to persons of ordinary skill in the art, and the concepts disclosed therein may be applied to other aspects without departing from the spirit or scope of the invention. Thus, the present invention is not intended to be limited to the aspects shown herein but is to be accorded the widest scope consistent with the principles and novel features disclosed herein.

Therefore, by means of an example a person having ordinary skill in the art will understand, that the flow chart is not exhaustive because certain blocks may be added or be unnecessary and/or may be carried out in parallel based on a particular implementation.

All structural and functional equivalents to the various illustrative logical blocks, modules, circuits, and algorithm blocks described in connection with the various aspects described throughout this disclosure that are known or later come to be known to those of ordinary skill in the art are expressly incorporated herein by reference and are intended to be encompassed by the claims. Such illustrative logical blocks, modules, circuits, and algorithm blocks may be implemented as electronic hardware, computer software, or combinations of both.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "block for."

What is claimed is:

1. A method for network switching with layer 2 switch communicatively coupled co-resident data-plane and network interface controllers, comprising:
   receiving a packet from a communication network at the layer 2 switch;
   parsing the packet; and
   determining in accordance with a content of the parsed packet whether the packet is to be switched to one of one or more medium access controllers, or one of one or more packet input processors, or one of one or more network interface controllers of a network interface resource comprising the one or more packet input processors, one or more packet output processors, the one or more network interface controllers, and the layer 2 switch, implemented on a chip, wherein
   the one or more packet input processors and the one or more packet output processors employ event driven processing.

2. The method as claimed in claim 1, wherein the receiving a packet from a communication network at the layer 2 switch, comprises:
   receiving the packet at one of the one or more medium access controllers; and
   providing the packet to the layer 2 switch.

3. The method as claimed in claim 1, further comprising:
   switching the packet to one of the one or more network interface controllers; and
   providing the packet to a destination entity by the network interface controller.

4. The method as claimed in claim 1, further comprising:
   switching the packet to one of the one or more packet input processors;
   processing the packet by the packet input processor to determine a destination entity; and
   providing the packet to the destination entity.

5. The method as claimed in claim 4, wherein the providing the packet to the destination entity comprises:
   providing the packet processed by the packet input processor to a storage;
   requesting the packet by the destination entity; and
   providing the packet to the destination entity.

6. The method as claimed in claim 4, wherein the providing the packet to the destination entity comprises:
   providing the packet to the destination entity via a packet handling entity.

7. The method as claimed in claim 4, wherein the providing the packet to the destination entity comprises:
   providing the packet to the destination entity via a packet handling entity, one of the one or more packet output processors, the layer 2 switch, and one of the one or more network interface controllers.

8. The method as claimed in claim 7, wherein the providing the packet to the destination entity via a packet handling entity, one of the one or more packet output processors, the layer 2 switch, and one of the one or more network interface controllers comprises:
   processing the packet in accordance with a packet management policy at the packet handling entity;
   switching the processed packet provided by the packet output processor by the layer 2 switch to the network interface controller; and
   providing the packet to the destination entity by the network interface controller.

9. The method as claimed in claim 8, wherein the processing the packet in accordance with a packet management policy at the packet handling entity comprises:
   switching the packet on layer 2 and layer 3.

10. A method for network switching with layer 2 switch communicatively coupled co-resident data-plane and network interface controllers, comprising:
    receiving an outgoing packet at an internal facing interface of one of one or more network interface controllers of a network interface resource comprising a layer 2 switch, one or more packet input processors, one or more packet output processors, and the one or more network interface controllers, implemented on a chip, wherein the one or more packet input processors and the one or more packet output processors employ event driven processing;
    providing the outgoing packet processed by the network interface controller to the layer 2 switch;
    parsing the outgoing packet; and
    determining in accordance with a content of the parsed outgoing packet whether the outgoing packet is to be switched to one of the one or more medium access controllers or one of the one or more packet input processors.

11. The method as claimed in claim 10, further comprising switching the outgoing packet to one of the one or more medium access controllers.

12. The method as claimed in claim 10, further comprising switching the outgoing packet to one of the one or more packet input processors.

13. The method as claimed in claim 12, further comprising providing the outgoing packet to a destination entity by the packet input processor via a packet handling entity comprising a software entity exercising on a processor of the network interface resource.

14. The method as claimed in claim 12, further comprising:
    providing the outgoing packet to a destination entity over a communication network via a packet handling entity comprising software entity exercising on a processor of the network interface resource, one of the one or more packet output processors, the layer 2 switch and one of the one or more medium access controllers.

15. The method as claimed in claim 14, wherein the providing the packet to a destination entity over a communication network via a packet handling entity, one of the one or more packet output processors, the layer 2 switch and one of the one or more medium access controllers, comprises:
    processing the packet in accordance with a packet management policy at the packet handling entity; and
    providing the processed packet to the destination entity over the communication network via the packet output processor, the layer 2 switch and the medium access controller.

16. The method as claimed in claim 15, wherein the processing the packet in accordance with a packet management policy at the packet handling entity comprises:
    switching the packet on layer L2 and layer L3.

17. A network interface apparatus, comprising:
    a semiconductor chip comprising one or more packet input processors, one or more packet output processors, one or more network interface controllers, one or more medium access controllers, wherein the one or more packet input processors and the one or more packet output processors employ event driven processing; and
    a layer 2 switch; wherein the layer 2 switch is communicatively coupled
       to network facing inbound interfaces of the one or more network interface controllers, to network facing outgoing interfaces of the one or more network interface controllers,
to network facing interfaces of the one or more packet input processors,
to network facing interfaces of the one or more packet output processors, and
to the one or more medium access controllers.

18. The network interface apparatus as claimed in claim 17, wherein each of the one or more medium access controllers is configured to:
receive a packet from a communication network; and
provide the packet to the layer 2 switch.

19. The network interface apparatus as claimed in claim 18, wherein the layer 2 switch is configured to:
parse the packet; and
switch the packet in accordance with the content of the parsed packet to one of the one or more medium access controllers, or one of the network facing interfaces of one of the one or more packet input processor, or one of the network facing interfaces of the one or more network interface controllers.

20. The network interface apparatus as claimed in claim 17, further comprising:
a storage communicatively coupled to each internal facing interface of the one or more network interface controllers; and
a processor implemented on the semiconductor chip communicatively coupled to each internal facing interface of the one or more packet input processors, to each internal facing interface of the one or more packet output processor, and to the storage.

21. The network interface apparatus as claimed in claim 20, wherein the processor is configured to:
process a packet provided by the storage in accordance with a packet management policy.

22. The network interface apparatus as claimed in claim 21, wherein the packet management policy comprises:
switch the packet route on layer 2 and layer 3.

23. The network interface apparatus as claimed in claim 17, wherein the layer 2 switch is configured to:
receive a packet from a network facing outgoing interface of one of the one or more network interface controllers;
parse the packet; and
switch the packet in accordance with the content of the parsed packet to one of the one or more medium access controllers or a network facing interface of one of the one or more packet input processors.

24. The network interface apparatus as claimed in claim 17, wherein the layer 2 switch is configured to:
receive a packet from a network facing interface of one of the one or more packet output processors;
parse the packet; and
switch the packet in accordance with the content of the parsed packet to one of the one or more medium access controllers or a network facing inbound interface of one of the one or more network interface controllers.

* * * * *